United States Patent [19]

Pugsley et al.

[11] 3,739,078

[45] June 12, 1973

[54] APPARATUS FOR REPRODUCING COLORED IMAGES

[75] Inventors: Peter C. Pugsley, Pinner; Mouayed E. Dobouny, Dartford, both of England

[73] Assignee: Crosfield Electronics Limited, London, England

[22] Filed: Jan. 19, 1971

[21] Appl. No.: 107,674

[30] Foreign Application Priority Data

Jan. 28, 1970 Great Britain .................... 4,147/70

[52] U.S. Cl. .................................... 178/5.2 A

[51] Int. Cl. .................................... G03f 3/08

[58] Field of Search .................. 178/5.2 A, 5.4 HE, 178/6.7 A; 355/88, 38, 83; 352/234

[56] References Cited

UNITED STATES PATENTS

| | | | |
|---|---|---|---|
| 2,981,792 | 4/1961 | Farber | 178/5.2 A |
| 3,324,235 | 6/1967 | Kyte | 178/5.2 A |
| 2,799,722 | 7/1957 | Neugebauer | 178/5.2 A |
| 3,527,540 | 9/1970 | Bowker et al. | 178/5.2 A |
| 3,560,638 | 2/1971 | Skrydstrup | 178/5.4 R |

*Primary Examiner*—Robert L. Griffin
*Assistant Examiner*—John C. Martin
*Attorney*—Kemon, Palmer & Estabrook

[57] ABSTRACT

In color picture reproducing apparatus of the kind in which a color picture analyzing scanner scans a color picture, element by element, and analyzes its color components to provide a number of electric signals representing respectively the densities of the different color components at the scanned elements, a circuit for changing a specified hue (such as flesh tone) recognizes the combination of signals representing the specified hue at any element and applies a correcting signal to one or more of the color channels to produce a desired modification of the hue.

5 Claims, 2 Drawing Figures

Figure 1:
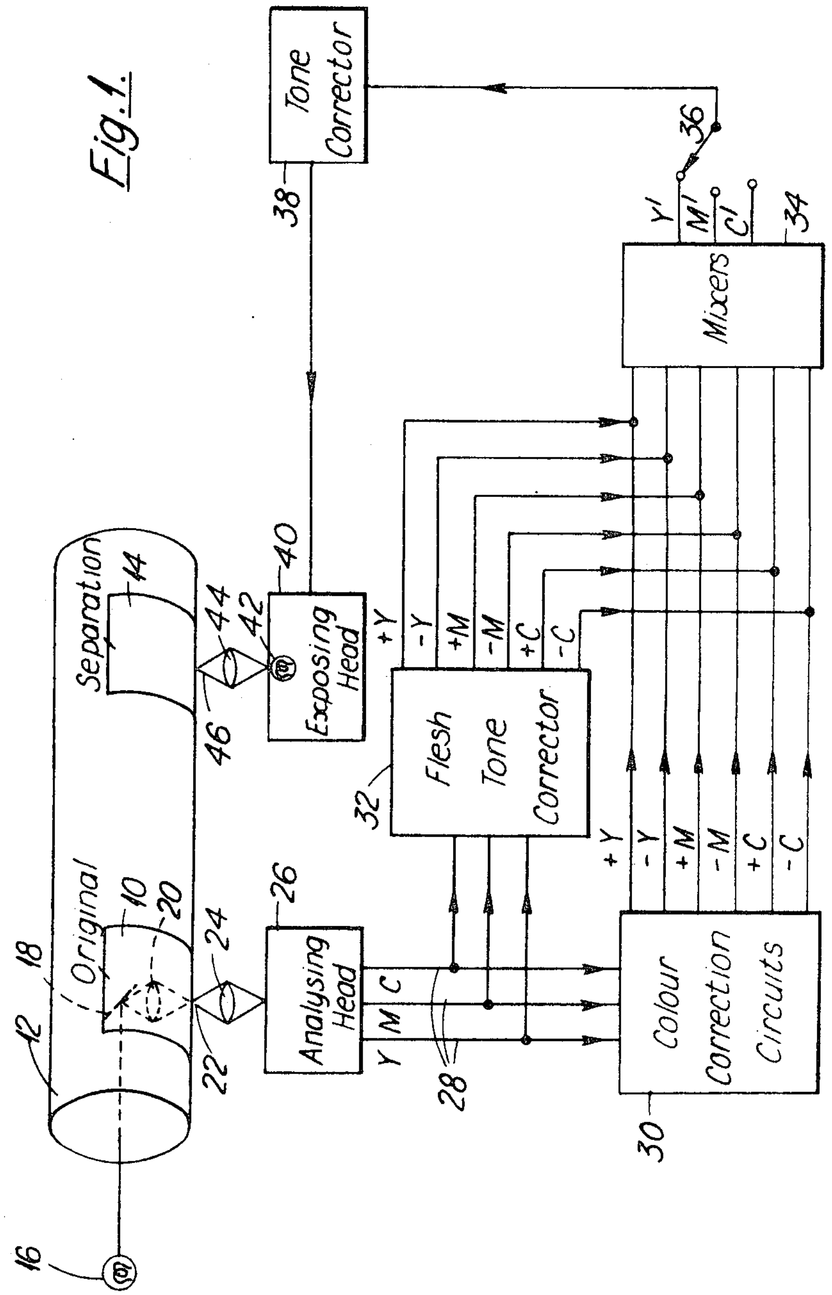

INVENTORS
PETER C. PUGSLEY
MOUAYED E. DOBOUNY
BY
Kemon, Palmer & Estabrook
ATTORNEYS

PATENTED JUN 12 1973 3,739,078

INVENTORS
PETER C. PUGSLEY
MOUAYED E. DOBOUNY
BY
Kemon, Palmer & Estabrook
ATTORNEYS

APPARATUS FOR REPRODUCING COLORED IMAGES

This invention is concerned with colour picture reproducing apparatus of the kind in which a colour picture analysing scanner scans a colour picture, element by element, and analyses its colour components to provide a number of electric signals, each representing by its value at any instant the density of a different colour component of the scanned element of the colour picture, and in which a correcting circuit having a colour-correcting channel for each of the colour-component signals modifies the signal values to provide corrected-component signals, and an exposing means responsive to a corrected signal exposes a photosensitive sheet by means of which a colour-component printer is to be made. The invention has for its object to enable a particular tone or hue in an image to be modified while other tones or hues are left unchanged, or at least changed only to a lesser extent.

The invention is particularly directed to the modifification of flesh tones in coloured images. This may be required for two reasons. Firstly, any coloured distortion in flesh tones is very noticeable and consequently if the flesh tones are not correct in the image to be reproduced, it is desirable to modify them for the reproduced image. Secondly, for advertising for display purposes it may be required to modify a flesh tone although it is of a natural colour; for example, it may be required to make pink flesh look brown.

According to the present invention, the correction circuit includes a hue recognition and modifying circuit responsive to the colour component signals and adapted, in response to a combination of colour component signal values which substantially corresponds to a predetermined hue, to apply a correcting signal to one or more colour channels to modify the hue represented by the colour-component signal values at the output of the correcting circuit. The recognition circuit may include means for adding voltages to all but one of the voltage signals in the colour channels to give equal resultant voltages for the flesh tone to be identified, and means which, when such equality or near equality is achieved, applies a correction signal to one or more of the output colour signals. In the preferred arrangement, the colour channel voltages, after the addition of the supplementary voltages, are applied both to a maximum signal selector circuit and to a minimum signal selector circuit and the difference between the maximum and minimum signals is then taken. A zero difference indicates that the element of the image which is being scanned is of the hue for which the supplementary voltages are set. A small difference indicates a very bery close to the required hue. In the preferred arrangement, zero difference corresponds to a maximum output from a differential amplifier. In this specification, for convenience we refer to recognising and modifying a particular hue, using the term "hue" in its popular sense. However, in terms of colour theory, in which the colour of an area is defined by its hue, its saturation (i.e. its dilution by white) and its brightness, the apparatus to be described recognises a particular combination of hue and saturation for any value of brightness.

Where flesh tones are being modified to change pink flesh to brown flesh, for example, it will generally be undesirable to modify pink tones occurring in any other part of the image, for example in a bowl of flowers. To achieve this selective modification, according to a subsidiary feature of the invention, a mask is cut or painted to the shape of the body in the image to be reproduced. The mask is scanned simultaneously with the scanning of the image. While the body is being scanned, a signal derived from the scanning of the mask permits the modification of pink tones if they occur. When the remainder of the image is being scanned, the signal derived by scanning the mask inhibits the flesh tone modifying circuit. The mask need not accurately follow the outline of the subject.

The mask may be attached to a scanning drum mounted upon the same shaft as the drum upon which the final image is formed. The signal derived from the mask scanning head will be a binary signal and it can be used to control an inhibit gate of known type connected in the flesh tone modifying circuit between the amplifier output and the controls.

If desired, the mask may have more than two colours so that the output from the scanning head has more than two levels. In such a case more than one flesh tone correcting circuit can be selectively controlled by the mask scanning head, to permit independent adjustment of the flesh tones of two models of different skin colouration in the same picture, for example.

It will be seen that this invention enables a flesh tone to be modified by the simple selection of supplementary voltages at the input of a modifying circuit and of a correction voltage at the output of the circuit. Previously such modifying was carried out by hand retouching in the final preparation of plates or cylinders.

Figure 2:
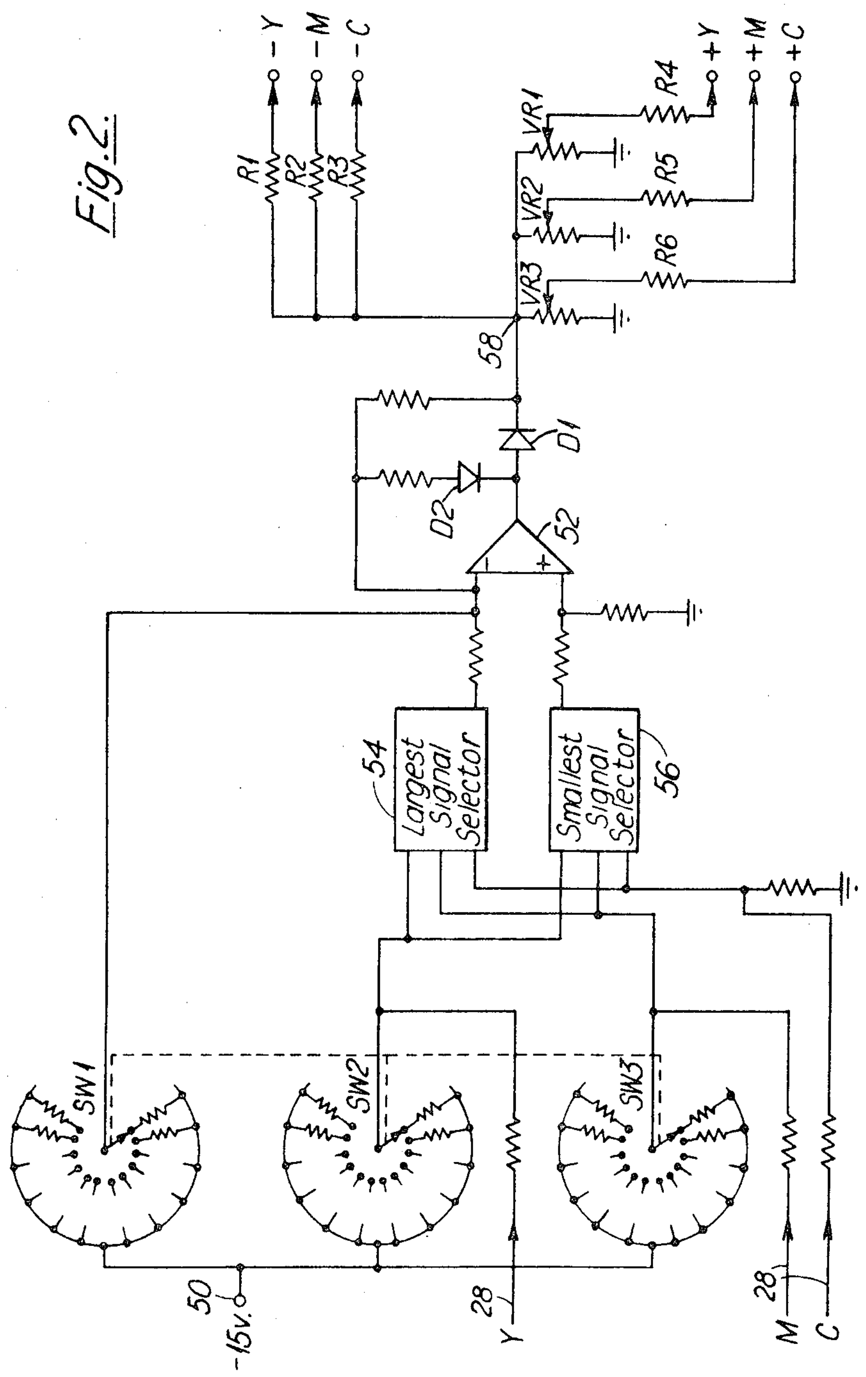

In order that the invention may be better understood, one example will now be described with reference to the accompanying drawing, in which:

FIG. 1 shows in block diagram a form of colour picture reproducing apparatus to which the invention may be applied; and FIG. 2 is a circuit diagram of the flesh tone modifying circuit.

In FIG. 1, an original picture 10 to be reproduced is placed around the periphery of a drum 12 and a photosensitive sheet 14 (to form a colour separation) is also placed on the periphery of the drum 12, axially spaced from the original 10. A light source 16, forming part of the colour picture analysing scanner, directs a beam of light into the hollow cylinder 12 and the light falls on a mirror arranged at an angle of 45° to the direction of the incident light beam. The reflected beam falls on a lens 20, also inside the cylinder, and this lens focuses it to a small spot 22 at the periphery of the drum where the original lies over the drum surface. The light passes through the original to a further lens 24 and is focused in an analysing head 26. The analysing head is of a well-known kind including dichroic filters to separate the light into three beams, one representing the cyan content of the original, another representing the magenta content of the original and the third representing the yellow content of the original. The three beams fall respectively on three photomultipliers which provide electric signals representing the cyan, magenta and yellow contents of the original. These signals are the output signals obtained on conductors 28 in FIG. 1. They are applied to colour correction circuits 30 of known kind. The principal function of these correction circuits is to compensate for lack of balance between the filters used in the analysing head and the printing inks. Thus if a first printing ink, representing a first of the printer colours, contains a small amount of a second printer colour, then the second printing ink must be reduced in quantity wherever the first printer colour occurs, since otherwise an excess of the second printer colour would be laid down. Suitable circuits are well-known in the printing art. In FIG. 1 these circuits provide output signals representing positive and negative yellow signals, position and negative magenta signals, and positive and negative cyan signals. In FIG. 1, the correction circuit also includes a flesh tone corrector 32. This circuit receives uncorrected signals on lines 28 and also provides positive and negative yellow, magenta and cyan signals to be added to those from the circuits 30 in the mixers 34. At the output of the mixers 34 there are three signals representing the corrected yellow component, the corrected magenta component and the corrected cyan component. In FIG. 1 it is assumed that the yellow printer is being made and the switch 36 is consequently set to receive the corrected yellow signal Y'. This signal is applied through a tone correction circuit 38 to an exposing head 40 containing an exposing lamp 42. The signal which reaches the exposing head modulates the light output of the lamp 42 and this light is focused by a lens 44 to a spot 46 at the surface of the photosensitive sheet 14. The hollow cylinder 12 is rotated continuously during scanning and means (not shown) are provided for achieving a relative displacement in the longitudinal direction of the cylinder between the cylinder 12 on the one hand and the analysing and exposing heads on the other hand. As a consequence the scanning light spots formed by the lamps 16 and 42 trace out helical paths around the cylinder periphery and the original and separation are scanned in a series of closely spaced parallel lines. Turning now to FIG. 2, rotary switches Sw1, Sw2 and Sw3 are ganged so that they are adjusted together to select one of 12 combinations of their fixed contacts. The fixed contacts of each switch are connected through different resistors to a common negative terminal 50 to which a voltage of −15 volts is applied. Consequently the wipers of the switches select one of 12 combinations of voltages. The voltage derived from switch Sw1 is added at the input of a differential amplifier 52 (to be referred to later). That derived from switch Sw2 is added to the yellow signal input on the corresponding line 28 and that derived from switch Sw3 is added to the magenta signal input on the corresponding line 28. The yellow and magenta signals, each with its "shift" voltage added, and the cyan signal are applied firstly to a largest signal selector circuit 54 and secondly to a smallest signal selector circuit 56. The outputs from these two circuits representing the largest and smallest signals, are applied respectively to the inverting and non-inverting inputs of the differential amplifier 52. The bias voltage provided by the switch Sw1 is also applied to the inverting input.

The amplifier 52 has in its output circuit a diode D1, arranged so that only positive signals pass through. The circuit is such that the output at terminal 58 is given by (S − L + K), where P indicates that only positive signals reach terminal 58, S and L represent the smallest and largest signals, and K represents the d.c. negative bias applied to the amplifier inverting input from the switch Sw1. If the signals on lines 28 represent the hue to be recognised, the voltages applied to circuits 54 and 56 (including the shift components provided by switches Sw2 and Sw3) are all equal and consequently the difference between the largest and smallest of these signals will be zero. Therefore the voltage of point 58 will be equal to K and this will be the signal available for correction purposes. It will be seen that the differential amplifier has a maximum output for the hue to be recognised, this output decreasing rapidly with increase between the largest and smallest signals from circuits 54 and 56, (i.e. as the colour departs from the hue to be recognised) and is zero over the remainder of the range of hues.

In FIG. 2, a further diode D2 maintains feedback around the differential amplifier 52 for negative signals. The signals at terminal 58 are applied on the one hand through resistors R1, R2 and R3 respectively to the −Y, −M and −C inputs of the mixers 34 (FIG. 1) and on the other hand through variable resistors VR1, VR2 and VR3 and through resistors R4, R5 and R6 to the +Y, +M and +C input of the mixers. In the example shown, each resistor R1, R2 and R3 had a value of 5.6 kilohms. The variable resistors had a maximum value of 5 kilohms and the fixed resistors R4, R5 and R6 had values of 3 kilohms. Thus, the resistances in the corresponding output leads (for example, −Y and +Y) are equal when the wipers of the variable resistors are approximately at their centre positions and adjustment to one side or the other of the centre position unbalances the outputs in opposite senses.

As previously indicated, this circuit is expected to be of principal use in the reproduction of hues representing flesh tones. The switches Sw2 and Sw3 permit a choice of 12 resistor combinations, each of which has been preset for a different flesh tone. For example, one may be set for a European flesh tone and another for a Japanese flesh tone. For each flesh tone, a suitable correcting voltage is derived from switch Sw1.

In the circuit described, voltage representing densities are used. Consequently, we are concerned only with the magnitudes of the differences between the cyan and yellow signals and between the cyan and magenta signals. Differences in the values of the actual signals which do not alter the differences between them simply affect the luminance of the predetermined flesh hue and not the hue itself.

It will be appreciated that in practice provision is usually made for a black printer in addition to the colour printers and that as a consequence the colour correction circuits additionally include undercolour removal circuits. The methods of generating a black printer signal and of under-colour removal are well-known.

We claim:

1. In colour picture reproducing apparatus including: a colour picture analysing scanner for scanning a colour picture, element by element, and analysing its colour components to provide a set of electric signals, each such scanner signal representing by its value at any instant the density of a different colour component of the scanned element of the colour picture; means including a colour component channel for each of the said colour component scanner signals for obtaining therefrom colour component printer signals; and means responsive to the colour-component printer signals for exposing photosensitive sheets by means of which colour-component printers can be made; the means for deriving the colour-component printer signals including a correcting circuit for correcting the value of at least one colour-component signal in dependence on the value of another colour-component signal; the improvement consisting in that the means for deriving the colour-component printer signals further includes:

a hue-recognitiion circuit including means for deriving colour-component signals from the said colour component channels and for adding a voltage to each of at least two of the derived signals, the voltage added to each derived signal being such that the resultant signals from the said colour channels, after addition of the said voltages, are of substantially equal value when the derived signals in combination, prior to the addition of the said voltages, represent the hue to be recognised;

and a hue-modifying circuit responsive to substantial equality of the said resultant signals to modify the colour printer signals obtained from the said colour channels and thereby to modify the reproduction of the said hue of the scanned colour picture.

2. Colour picture reproducing apparatus as defined in claim 1, in which the means responsive to substantial equality of the resultant signals includes a maximum signal selector circuit and a minimum selector circuit for selecting the largest and smallest of the colour-representing signals, respectively, after the said voltage addition, and a comparator for comparing the largest and smallest signals.

3. Colour picture reproducing apparatus as defined in claim 1, in which the means for adding a voltage to a colour component signal includes, for each colour component signal to which a voltage is to be added, a voltage selector circuit, whereby different combinations of voltages may be selected, each different combination representing a different hue to be recognised.

4. Colour picture reproducing apparatus as defined in claim 3, in which the means responsive to substantial equality of the resultant signals includes a maximum signal-selector circuit and a minimum signal-selector circuit for selecting the largest and smallest of the colour-representing signals, respectively, after the said voltage addition, and a comparator for comparing the largest and smallest signals, the apparatus additionally including a further voltage-selector circuit, adjusted in step with the voltage-selector circuits for the said colour-component signals to select one of a number of preset biasing voltages and to add the selected biasing voltage to the output of one of said signal-selector circuits for application to said comparator.

5. In colour picture reproducing apparatus including: a colour picture analysing scanner for scanning a colour picture, element by element, and analysing its colour components to provide a set of electric signals, each such scanner signal representing by its value at any instant the density of a different colour component of the scanned element of the colour picture; means including a colour component channel for each of the said colour component scanner signals for obtaining therefrom colour component printer signals; and means responsive to the colour-component printer signals for exposing photosensitive sheets by means of which colour-component printers can be made; the means for deriving the colour-component printer signals including a correcting circuit for correcting the value of at least one colour-component signal in dependence on the value of another colour-component signal; the improvement consisting in that the means for deriving the colour-component printer signals further includes:

a hue-recognition circuit including means for detecting the existence of a set of differences, between the values of different ones of the set of colour-component signals, which substantially correspond to predetermined colour-component signal differencs defining a predetermined hue, said hue-recognition circuit including adjustable hue-selecting means variable over a range of values of each of the colour component signals to select any hue defined by colour component values within the said ranges;

and a hue-modifying circuit responsive to the detection of the said set of actual differences corresponding to the predetermined differences and operative to apply a modifying signal to one or more colour-component channels to modify the reproduction of the said hue of the original picture, each modifying signal having a value which is continuously variable over a range, having a maximum value for exact correspondence of the said actual and predetermined differences, and decreasing with both increase and decrease in any of the said actual differences.

* * * * *